US009336767B1

United States Patent
Barton et al.

(10) Patent No.: US 9,336,767 B1
(45) Date of Patent: May 10, 2016

(54) DETECTING DEVICE PROXIMITIES

(71) Applicant: Rawles LLC, Wilmington, DE (US)

(72) Inventors: William Folwell Barton, Harvard, MA (US); Kavitha Velusamy, San Jose, CA (US); Philip Ryan Hilmes, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 231 days.

(21) Appl. No.: 14/229,454

(22) Filed: Mar. 28, 2014

(51) Int. Cl.
*G10K 11/16* (2006.01)

(52) U.S. Cl.
CPC ...................................... *G10K 11/16* (2013.01)

(58) Field of Classification Search
CPC . G10K 11/16; G10K 11/002; G10K 11/1784; G10K 11/1786; H04M 9/08; H04M 9/082; H04M 3/002; G10L 21/02082; G10L 21/02; H04B 7/015; H04B 3/20; H04B 3/23; H04B 3/235; H04B 3/237; H04B 3/238
USPC ........ 381/71.11, 71.9, 66, 92, 303, 94.1, 110; 379/387.01–392.01, 406.01–406.16; 700/94
See application file for complete search history.

(56) References Cited

U.S. PATENT DOCUMENTS

| 7,418,392 B1 | 8/2008 | Mozer et al. |
| 7,720,683 B1 | 5/2010 | Vermeulen et al. |
| 7,774,204 B2 | 8/2010 | Mozer et al. |
| 2012/0223885 A1 | 9/2012 | Perez |
| 2013/0156209 A1* | 6/2013 | Visser ................... H04M 1/035 381/66 |
| 2014/0024317 A1* | 1/2014 | Kechichian ....... H04M 1/72536 455/67.13 |
| 2015/0098578 A1* | 4/2015 | Dadu ..................... H04B 7/015 381/66 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Vivian Chin
*Assistant Examiner* — Jason R Kurr
(74) *Attorney, Agent, or Firm* — Lee & Hayes, PLLC

(57) ABSTRACT

An audio device may be configured to produce output audio and to capture input audio for speech recognition. In some cases, a second device may also be used to capture input audio to improve isolation of input audio with respect to the output audio. In addition, acoustic echo cancellation (AEC) may be used to remove components of output audio from input signals of the first and second devices. AEC may be implemented by an adaptive filter based on dynamically optimized filter coefficients. The filter coefficients may be analyzed to detect situations in which the first and second devices are too close to each other, and the user may then be prompted to increase the distance between the two devices.

24 Claims, 4 Drawing Sheets

DETECTING DEVICE PROXIMITIES

BACKGROUND

As the processing power available to devices and associated support services continues to increase, it has become practical to interact with users through speech. For example, various types of devices may generate speech or render other types of audio content for a user, and the user may provide commands and other input to the device by speaking.

In a device that produces sound and that also captures a user's voice for speech recognition, acoustic echo cancellation (AEC) techniques are used to remove device-generated sound from microphone input signals. The effectiveness of AEC in devices such as this is an important factor in the ability to recognize user speech in received microphone signals.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
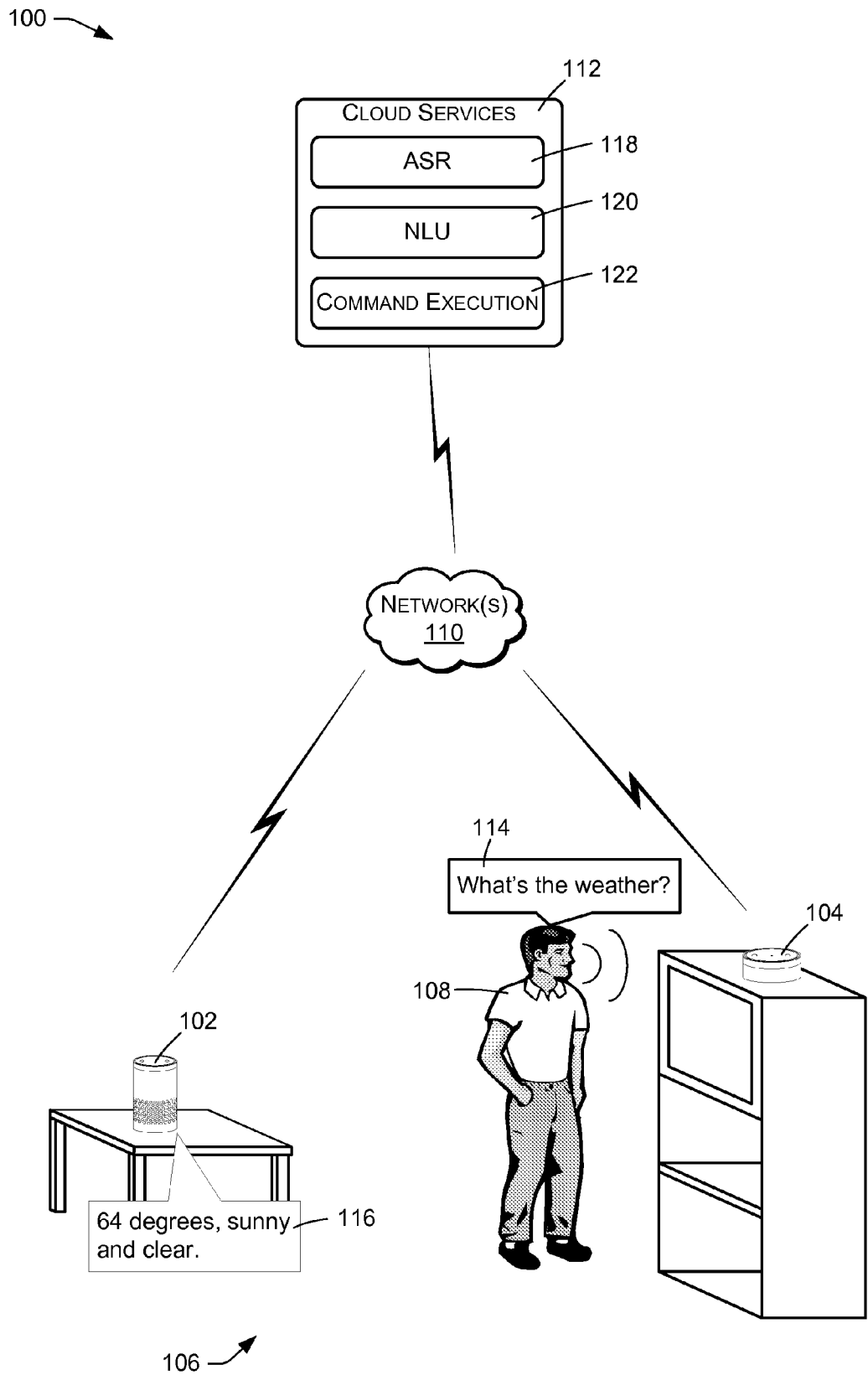
FIG. 1 shows an illustrative voice interactive computing architecture that includes primary and secondary assistants that interact by voice with a user in conjunction with cloud services.

A distributed voice controlled system may be used to interact with a user through speech, including user speech and device generated speech. In certain embodiments, the distributed voice controlled system may have a primary assistant and one or more secondary assistants. The primary assistant has a microphone for capturing input audio and a speaker for generating output audio. The input audio may include user speech and other environmental audio. The output audio may include machine-generated speech, music, spoken word, or other types of audio.

The secondary assistant has a microphone that may be used to supplement the capabilities of the primary assistant by capturing user speech from a different location than the primary assistant. The distributed voice controlled system may utilize the audio captured by either or both of the primary and secondary assistants to recognize, interpret, and respond to speech uttered by the user.

Both the primary assistant and the secondary assistant may be configured to perform acoustic echo cancellation (AEC) to remove components of the speaker-generated audio from their microphone signals. The AEC performed at the primary assistant may at times be hindered by the proximity of the device's speaker to its microphone. The AEC performed at the secondary assistant may be more effective due to an increased distance between the microphone of the secondary assistant and the speaker of primary assistant. Accordingly, speech recognition may at times be more effective when performed with respect to the echo-cancelled microphone signal of the secondary assistant.

However, advantages obtained by utilizing the microphone of the secondary assistant may be negated when the secondary assistant is placed too near the primary assistant. In cases such as this, the output audio from the primary assistant may be so strong in the microphone signal of the secondary assistant that AEC is not effective at the secondary assistant.

In described embodiments, AEC is performed at both the primary and secondary assistants by adaptive finite impulse response (FIR) filters, which operate in response to dynamically calculated filter coefficients. The filter coefficients may be analyzed at the secondary assistant to determine whether the distance between the primary and secondary assistants is sufficient to provide the intended advantages of the supplementary microphone of the secondary assistant. If the primary and secondary assistants are too close, a notification may be provided instructing a user that the devices should be moved away from each other.

In some cases, the secondary assistant may be configured to determine an actual distance from the primary assistant by identifying an AEC coefficient peak corresponding to the direct acoustic path from the primary assistant to the secondary assistant. In other cases, the secondary assistant may be configured to determine the strength of output audio in the microphone input signal in relation to desired audio such as user speech.

FIG. 1 shows an example of a distributed voice controlled system 100 having a primary assistant or device 102 and one or more secondary assistants or devices 104. The system 100 may be implemented within an environment 106 such as a room or an office, and a user 108 is present to interact with the voice controlled system 100. Although only one user 108 is illustrated in FIG. 1, multiple users may use the voice controlled system 100.

In this illustration, the primary assistant 102 is physically positioned on a table within the environment 106. The secondary assistant 104 is placed on a cabinet or other furniture and physically spaced at a distance from the primary assistant 102. In other implementations, the primary assistant 102 and secondary assistant 104 may be placed in any number of locations (e.g., ceiling, wall, in a lamp, beneath a table, on a work desk, in a hall, under a chair, etc.). When in the same room, the two assistants 102 and 104 may be placed in different areas of the room to provide greater coverage of the room. Although only one secondary assistant 104 is illustrated, there may be multiple secondary assistants as part of the system 100.

The assistants 102 and 104 are configured to communicate with one another via one or more wireless networks or other communications media 110, such as Bluetooth, Ethernet, Wi-Fi, Wi-Fi direct, or the like. Each of the voice controlled assistants 102 and 104 is also communicatively coupled to cloud services 112 over the one or more networks 110. The cloud services 112 may host any number of applications that can process user input received from the voice controlled system 100 and produce suitable responses. Example applications may include or relate to web browsing, online shopping, banking, bill payment, email, work tools, productivity, entertainment, education, and so forth.

In FIG. 1, the user 108 is shown communicating with the cloud services 112 via the assistants 102 and 104. In the illustrated scenario, the user 108 is speaking in the direction toward the secondary assistant 104, and asking an audible question, "What's the weather?", as represented by the dialog bubble 114. The secondary assistant 104 is equipped with one or more microphones to receive the voice input from the user 108 as well as any other audio sounds in the environment 106.

The user 108 may also speak in the direction toward the primary assistant 102, which may also have one or more microphones to capture user speech and other audio. The cloud services 112 may respond to input from either of the assistants 102 and 104.

In response to the spoken query 114, the system 100 may respond with generated speech as indicated by the dialog bubble 116. The response 116 may be generated by the primary assistant 102, which may have one or more speakers to generate audio. In this example, the response 116 indicates, in response to the query 114, that the weather is "64 degrees, sunny and clear."

Functionally, one or more audio streams may be provided from the assistants 102 and/or 104 to the cloud services 112. The audio provided by the microphones of the assistants 102 and 104 may be processed by the cloud services 112 in various ways to determine the meaning of the spoken query 116 and/or the intent expressed by the query 116. For example, The cloud services may implement automated speech recognition (ASR) 118 to obtain a textual representation of user speech that occurs within the audio. The ASR 118 may be followed by natural language understanding (NLU) 120 to determine the intent of the user 108. The cloud services 112 may also have command execution functionality 122 to compose and/or implement commands in fulfilment of determined user intent. Such commands may be performed by the cloud services 112 either independently or in conjunction with the primary assistant 102, such as by generating audio that is subsequently rendered by the primary assistant 102. In some cases, the cloud services may generate a speech response, such as the response 116, which may be sent to and rendered by the primary assistant 102.

The distributed voice controlled system 100 allows the user 108 to interact with local and remote computing resources predominantly through speech. By placing the primary assistant 102 and one or more secondary assistants 104 throughout the environment 106, the distributed voice controlled system 100 enables the user 108 to move about his or her home and interact with the system 100. With multiple points from which to receive speech input, the audio speech signals can be detected and received more efficiently and with higher quality, minimizing the problems associated with location and orientation of the speaker relative to the audio input devices.

Each of the assistants 102 and 104 may be configured to perform acoustic echo cancellation (AEC) with respect the audio signals produced by their microphones. Acoustic echo cancellation (AEC) is performed to remove or suppress components of the output audio that is produced by the speaker of the primary assistant 102.

Figure 2:
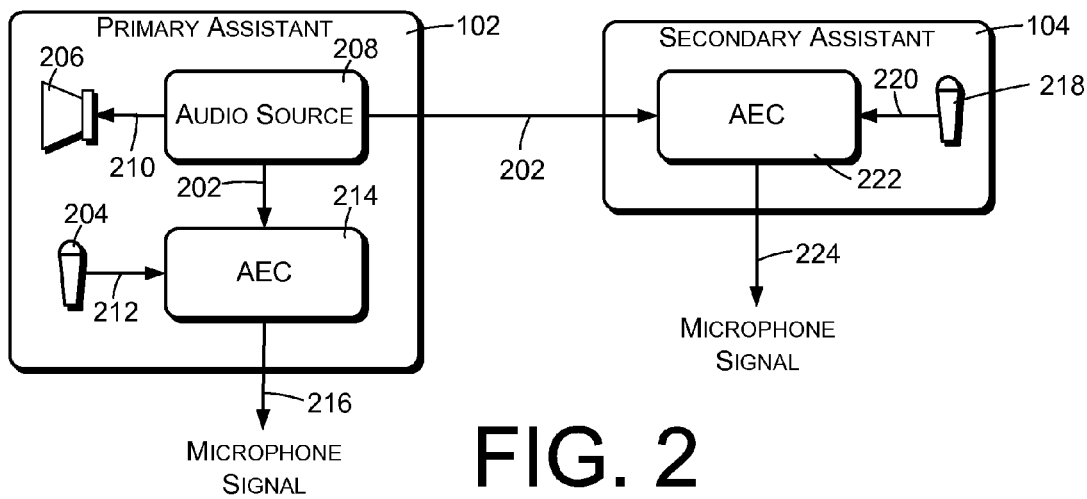
FIG. 2 is a block diagram illustrating an audio processing configuration that may be implemented within the architecture of FIG. 1 for acoustic echo cancellation.

FIG. 2 illustrates an example of how the primary assistant 102, which produces output audio, interacts with the secondary assistant 104 so that AEC may be performed on microphone signals of both the primary and secondary assistants 102 and 104. In this case, AEC is intended to cancel the output audio that is produced by the primary assistant 102.

A reference signal 202, representing output audio of the primary assistant 102, is provided from the primary assistant 102 to the secondary assistant 104 and used by the secondary assistant 104 for AEC. The reference signal 202 may be provided using wireless communications such as Bluetooth or Wi-Fi. Wired communications media may also be used. The reference signal 202 may be a digital signal, comprising a sequence of reference signal values or samples.

The primary assistant 102 has a microphone 204 and a speaker 206. The speaker 206 produces output audio in response to an audio source 208. The audio source 208 may comprise an audio stream, which may be provided from the cloud services 112, from a local file or data object, or from another source. The speaker 206 is responsive to an output audio signal 210 produced by or based upon the audio source to produce the output audio. The reference signal 202 may be the same or similar to the output audio signal 210, or may be generated based upon the output audio signal 210.

The microphone 204 creates a microphone input signal 212 that is received and processed by an AEC component 214, also referred to herein as an acoustic echo canceller 214. The AEC component 214 performs acoustic echo cancellation on the input audio signal 212 based on the reference signal 202 corresponding to the audio source 208. The resulting echo-cancelled microphone input signal 216 may in turn be provided to the cloud services 112 for speech recognition, language understanding, and command implementation. Alternatively, speech recognition, language understanding, and command implementation may in some embodiments be performed by the primary assistant 102 itself.

The secondary assistant 104 has a microphone 218 that provides a microphone input signal 220. An AEC component 222, also referred to as an acoustic echo canceller 222, receives the microphone input signal 220 and the reference signal 202 and performs echo cancellation to suppress or remove components of output audio from the microphone input signal 220. The resulting echo-canceled microphone input signal 224 may in turn be provided to the cloud services 112 for speech recognition, language understanding, and command implementation. In some cases, the echo-canceled microphone input signal 224 may be provided to the primary assistant 102, which may in turn provide the microphone signal 224 to the cloud-based services.

Figure 3:
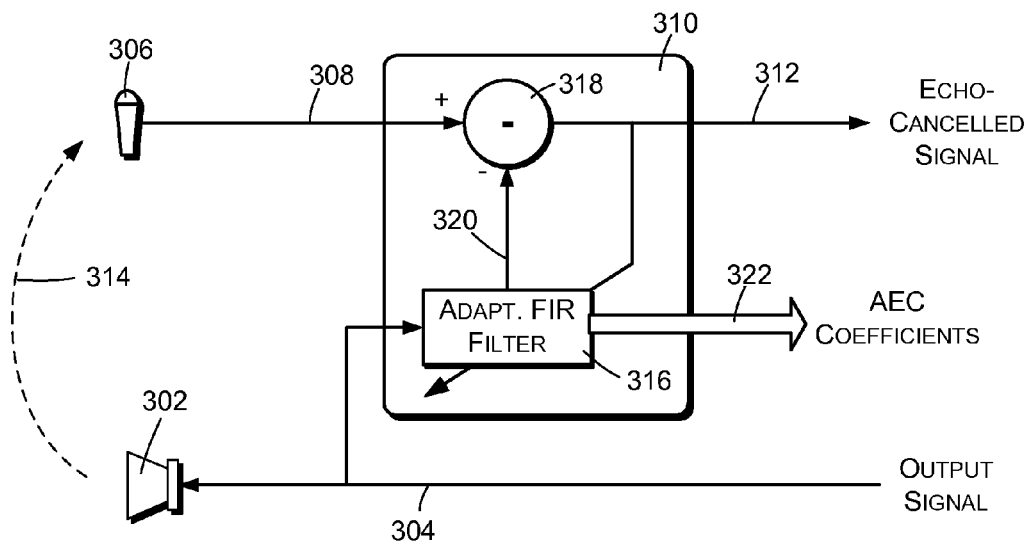
FIG. 3 is a block diagram illustrating an example technique for acoustic echo cancellation.

FIG. 3 illustrates a general example of AEC functionality. Functionality such as this may be implemented by either or both of the primary and secondary assistants 102 and 104.

A speaker 302 is responsive to an output signal 304 to produce output audio within an environment. A microphone 306 is configured to produce an input signal 308 representing audio in the environment, which may include the output audio produced by the speaker 302. An AEC component 310 processes the input signal 308 to cancel or suppress components of the output audio from the input audio signal 308, and to produce an echo-suppressed or echo-cancelled signal 312. Such components of the output audio may be due to one or more acoustic paths 314 from the speaker 302 to the microphone 306. The acoustic paths 314 may include a direct acoustic path from the speaker 302 to the microphone 306 as well as indirect or reflective acoustic paths caused by acoustically reflective surfaces within the environment.

The AEC component 310 receives the output signal 304, referred to as a reference signal in the AEC environment, which represents the output audio. The AEC component 310 has an adaptive finite impulse response (FIR) filter 316 and a subtraction component 318. The FIR filter 316 generates an estimated echo signal 320, which represents one or more components of the output signal 304 that are present in the input signal 308. The estimated echo signal 320 is subtracted from the input signal 308 by the subtraction component 318 to produce the echo-cancelled signal 312.

The FIR filter 316 estimates echo components of the input signal 308 by generating and repeatedly updating a sequence of filter parameters or coefficients 322 that are applied to the reference signal 304 by the FIR filter 316. The adaptive FIR filter 316 calculates and dynamically updates the coefficients 322 so as to continuously and adaptively minimize the signal power of the echo-cancelled input signal 312, which is referred to as an "error" signal in the context of adaptive filtering.

Referring again to FIG. 2, either or both of the AEC components 214 and 222 may be implemented by a signal processing element such as the AEC component 310 of FIG. 3.

Figure 4:
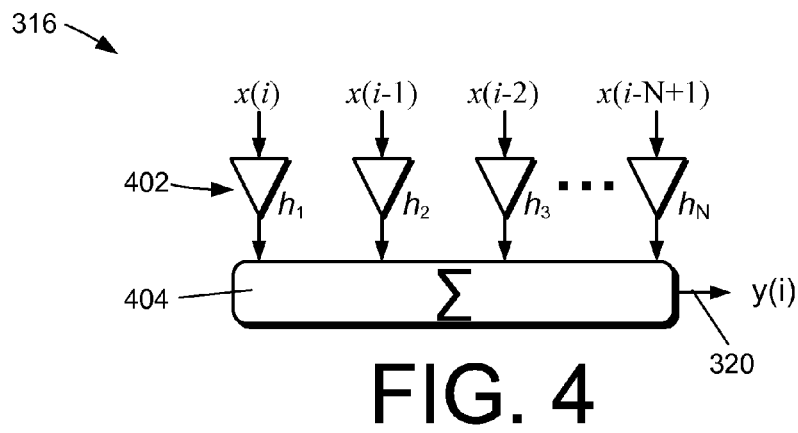
FIG. 4 is a diagram of an adaptive finite impulse response (FIR) filter that may be used in the acoustic echo cancellation of FIG. 4.

FIG. 4 shows an example implementation of the FIR filter 316 such as may be used in the AEC components 214 and 222. The FIR filter 316 receives the reference signal 304 in the form of sampled reference values x(i) through x(i−N+1), where N is the filter order of the filter 316. A plurality of multipliers 402 are used to multiply the reference values by respective coefficients or weights 322, identified in FIG. 4 as $h_1$ through $h_N$. The resulting products are summed by a summing function 404 to form a sample value y(i) of the estimated echo signal 320. Thus, the estimated echo signal 320 comprises a weighted summation of previous values of the reference signal. The multipliers 402 of the FIR filter 316 are referred to as taps, and the number of taps defines the order of the filter 316.

The filter coefficients h are calculated dynamically and updated iteratively as new input and reference signal samples are received. The calculations of the filter coefficients may be performed using various techniques. For example, AEC coefficients may be calculated using normalized least mean square algorithm or total least square algorithms, with the objective of minimizing the signal power of the echo-cancelled audio signal 312.

The filter coefficients h are generated in a temporal sequence, where each coefficient of the sequence corresponds to a respective point in time prior to the current time. A peak in the sequence of coefficients corresponds to a prominent echo of the reference signal 304 in the input audio signal 308. The relative position of the peak within the sequence indicates the time of propagation of the echo from the speaker 302 to the microphone 306. The magnitude of the peak indicates the strength of the echo. Because echoes are normally caused by reflective surfaces, the distances of reflective surfaces from the microphone array may be determined by analyzing the coefficients produced by the FIR filter 316, based on the known propagation speed of sound. The distance from the speaker to the microphone may also be determined by identifying the first peak in the sequence, which corresponds to a direct acoustic path from the speaker to the microphone.

Not that in the embodiments described herein, the speaker 302 may be part of the primary assistant 102 and the microphone 306 may be part of the secondary assistant 104.

Figure 5:
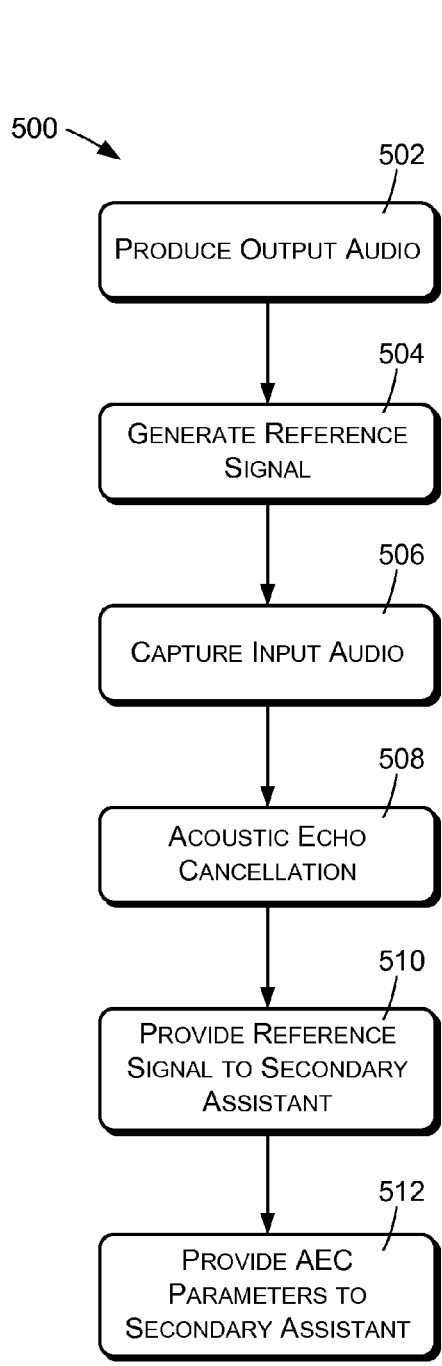
FIG. 5 is a flow diagram illustrating relevant actions that may be performed by the primary assistant of FIG. 1.

FIG. 5 illustrates an example method 500 that may be performed by the primary assistant 102 in certain embodiments. An action 502 comprises producing output audio at the speaker 206 of the primary assistant 102. The output audio may comprise speech, music, or other sound.

An action 504 comprises generating a reference signal 202 that is based on the output audio signal 210 and represents audio produced by the speaker 206 of the primary assistant 102. The reference signal 202 may be used by the AEC component 214 for performing AEC at the primary assistant 102.

An action 506 comprises capturing audio with one or more microphones 204 of the primary assistant 102. The captured audio may include user speech and other environmental sound, and may also include the output audio due to direct or indirect acoustic paths between the microphone 204 and the speaker 206.

An action 508 comprises performing acoustic echo cancellation to cancel or suppress the output audio that is potentially present in the captured audio, based on the reference signal 202 and filter parameters such as the FIR filter coefficients 322 described above. In particular, the action 506 may include applying an adaptive FIR filter to the input audio signal 212, where the FIR filter estimates components of the output audio based at least in part on the reference signal 202. The resulting signal is referred to herein as an echo-cancelled audio signal 216. Note that the term "echo" may at times refer to components of output audio that are due to either or both of direct acoustic paths and indirect or reflective acoustic paths.

An action 510 comprises providing the reference signal 202 from the primary assistant 102 to the secondary assistant 104. The secondary assistant 104 may use the reference signal 202 to perform AEC with respect to audio captured by the secondary assistant 104.

An action 512 comprises providing AEC parameters from the primary assistant 102 to the secondary assistant 104. The AEC parameters may comprise the FIR filter coefficients produced by the AEC component 214 of the primary assistant 102. The secondary assistant 104 may use these parameters in some embodiments to evaluate whether there is sufficient distance between the two assistants 102 and 104.

Figure 6:
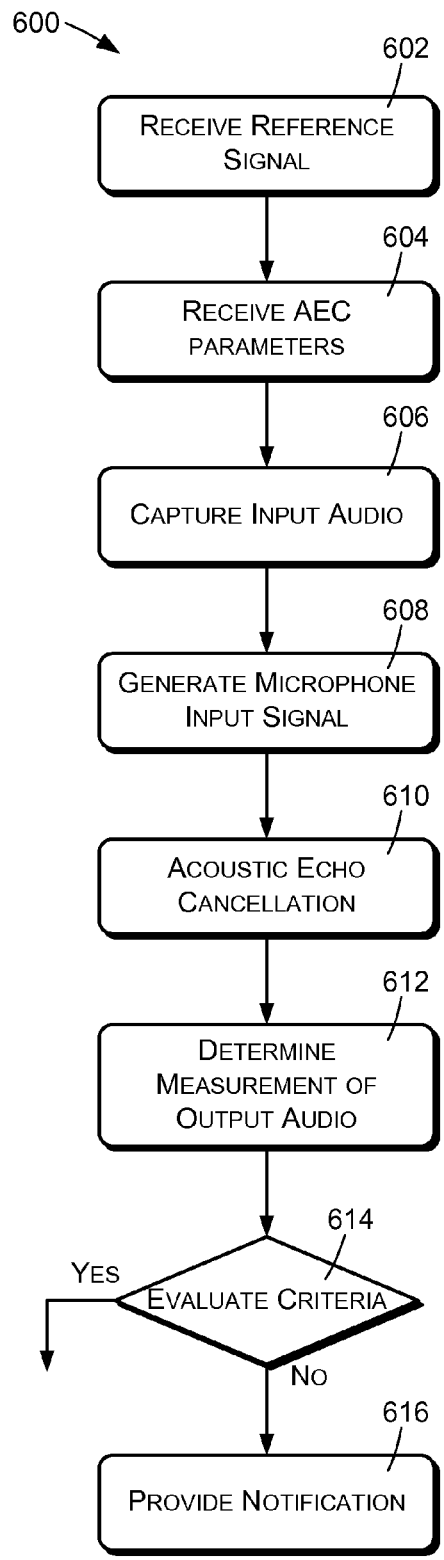
FIG. 6 is a flow diagram illustrating relevant actions that may be performed by the secondary assistant of FIG. 1.

FIG. 6 illustrates an example method 600 that may be performed by the secondary assistant 102 in certain embodiments. An action 602 comprises receiving the reference signal 202 from the primary assistant 102. The reference signal 202 represents audio produced by the speaker 206 of the primary assistant 102.

An action 604 comprises receiving AEC parameters from the primary assistant 102. The AEC parameters may comprise the FIR filter coefficients produced by the AEC component 214 of the primary assistant 102. The secondary assistant 104 may use these parameters in some embodiments to evaluate whether there is sufficient distance between the two assistants 102 and 104.

An action 606 comprises capturing input audio with one or more microphones 218 of the secondary assistant 104. The captured input audio may include user speech and other environmental sound, and may also include the output audio produced by the speaker 206 of the primary assistant due to direct or indirect acoustic paths between the microphone 218 of the secondary assistant 104 and the speaker 206 of the primary assistant 102.

An action 608 comprises generating the microphone input signal 220, which represents the input audio. This action may be performed by an analog-to-digital converter.

An action 610 comprises cancelling the output audio from the microphone input signal 220, based on the reference signal 202 and a sequence of dynamically updated filter parameters or coefficients generated by the AEC component 222 such as the FIR filter coefficients 322 described above. In particular, the action 606 may include applying an adaptive FIR filter to the input audio signal 220, where the adaptive FIR filter estimates components of the output audio based at least in part on the reference signal 202 provided from the primary assistant 102. The resulting signal is referred to herein as an echo-cancelled microphone input audio signal 220.

An action 612 comprises determining a measurement of the output audio in the input audio signal 220 by analyzing the sequence of filter parameters generated by the AEC component 222. As an example, the measurement may indicate a strength, magnitude, or amount of the output audio that occurs in the input audio signal 220, which will be referred to herein as a coupled output strength. As another example, the measurement may indicate a distance between the primary and secondary assistants 102 and 104. Various more specific examples of calculating such a measurement are discussed in more detail below.

An action 614 comprises determining whether the determined measurement satisfies a given criteria. As an example, the criteria may comprise a minimum and/or maximum distance between the primary and secondary assistants. As another example, the criteria may comprise a maximum coupled output strength.

If the determined measurement does satisfy the criteria, no further actions are performed. If the determined measurement does not satisfy the criteria, an action 616 is performed, comprising providing a notification that one of the two assistants 102 or 104 should be moved to increase the distance between the devices until the determined measurement satisfies the given criteria. The action 618 may be performed as a speech notification, by activating an indicator on one of the primary and secondary assistants 102 or 104, or by other means.

In one embodiment, the measurement of the output audio may comprise a calculated distance between the two devices, the criteria may comprise a minimum and/or maximum distance, and the action 614 of evaluating the criteria may comprise comparing the distance to the minimum and/or maximum distance threshold. If the determined distance is less than the minimum threshold, the user may be prompted to move one or the other of the assistants 102 and 104 to increase the distance. If the determined distance is greater than the maximum threshold, the user 108 may be prompted to move one or the other of the assistants 102 and 104 to decrease the distance between the devices.

Determining the distance between the two devices may be performed by identifying a peak filter coefficient or parameter in the AEC coefficients that corresponds to the direct acoustic path from the primary assistant 102 to the secondary assistant 104. This is usually the first peak in the sequence of AEC coefficients. The AEC coefficients correspond to increasing propagation times of the output audio from the primary assistant 102 to the secondary assistant 104. Accordingly, the distance traveled by the output audio, corresponding to the distance between the primary and secondary assistants 102 and 104, may be determined based on the location of the peak coefficient in the AEC coefficient sequence given a known system sample rate.

In other embodiments, the measurement of the output audio may comprise a strength or magnitude of the output audio that is present in the input audio signal 220, referred to herein as the coupled output strength. The coupled output strength may be evaluated or calculated in various ways. As one example, the magnitude of the peak coefficient discussed above may be used as an indication of the coupled output strength.

In one embodiment, the coupled output strength may be calculated by aggregating or averaging AEC filter coefficients of the AEC component 220. For example, the coupled output strength may be calculated as a sum of the squared values of the AEC coefficients. In some cases, a subset of the AEC coefficients may be averaged in this manner or used as a basis for calculating the coupled output strength. For example, a set of the AEC coefficients corresponding to relatively short distances between the two devices may be considered when making the calculations. More specifically, such a set may comprise those coefficients that correspond to the direct acoustic path from the primary assistant 102 to the secondary assistant 104. These coefficients may be defined as being within a region or portion of the AEC coefficient sequence that includes the first peak coefficient.

In some embodiments, the coupled output strength may be determined by (a) identifying a first set of AEC coefficients that correspond to the direct acoustic path from the primary assistant 102 to the secondary assistant 104, (b) identifying a second set of AEC coefficients that correspond to one or more indirect or reflective acoustic paths from the primary assistant 102 to the secondary assistant 104, and (c) comparing the first and second sets of AEC coefficients. More specifically, the energy of each set of coefficients may be calculated as a sum of the squared values of the coefficients, and the energies exhibited by the first and second sets of coefficients may be compared. In some cases, a ratio of these energies, corresponding to direct and reflective acoustic paths, respectively, may be compared to a criteria such as a threshold.

In certain embodiments, the measurement of the output audio in the input audio signal may be calculated based on AEC coefficients produced by both the primary and secondary assistants 102 and 104. For example, first and second coupled output strengths may be calculated at the primary assistant 102 and the secondary assistant 104, respectively, using any of the techniques described above. The first and second coupled output strengths may then be compared. For best performance, the second coupled output strength should be less than the first coupled output strength. In some cases, a ratio of the first and second coupled strengths may be compared to a threshold criteria to determine whether there is sufficient distance between the primary and secondary assistants.

In some embodiments, the actions depicted by FIG. 6 may be performed continuously or at periodically intervals to check for the presence of conditions that may be problematic to AEC and to notify the user when the first and second assistants are too close to each other. In other embodiments, the depicted actions may be performed in response to a condition, signal, or status indicating the possibility that the proximity of the primary and secondary assistants may be causing problems. For example, the speech recognition component 118 may detect and indicate an impairment in the ability to recognize speech.

In some cases, the actions of FIG. 6 may be performed during an initialization process during which a test sound is played by the speaker 206 of the primary assistant 102. Furthermore, the actions of FIG. 6 may be performed as part of a diagnostic mode or procedure.

Note that the various functions and activities described above may be distributed different among various assistants or other devices. For example, distance and coupled output strength calculations may be performed by the primary assistant, the secondary assistant, or by another device that receives appropriate data from the primary and secondary assistants. Furthermore, distances may be calculated for multiple secondary assistants to ensure that they are at sufficient distances from the primary assistant.

Figure 7:
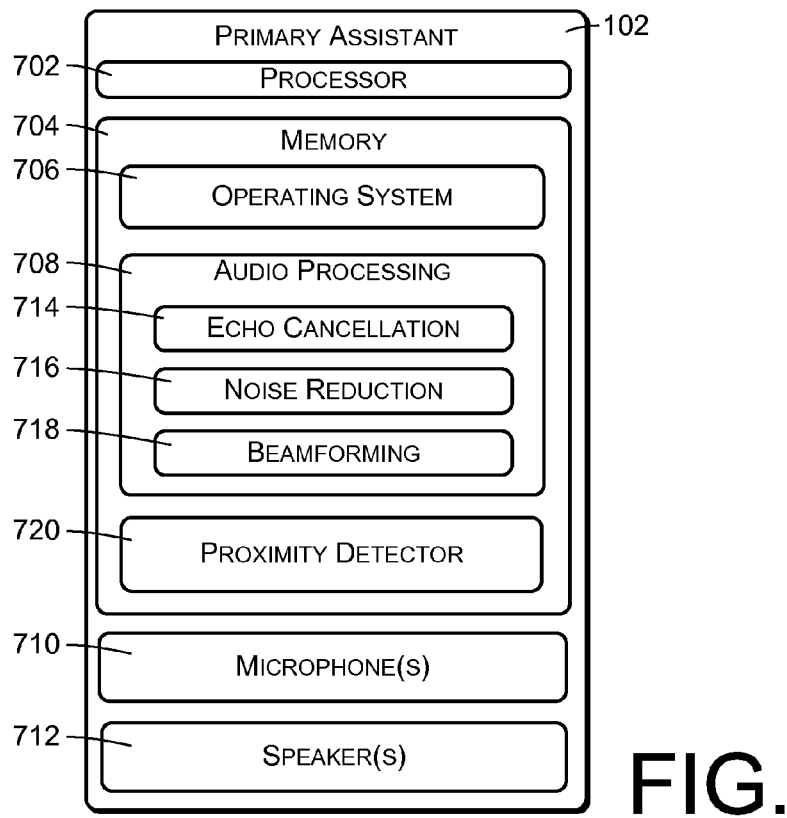
FIG. 7 is a block diagram illustrating example components and functionality of the primary assistant.

FIG. 7 shows an example functional configuration of the primary assistant 102. The primary assistant 102 includes operational logic, which in many cases may comprise a processor 702 and memory 704. The processor 702 may include multiple processors and/or a processor having multiple cores. The memory 704 may contain applications and programs in the form of instructions that are executed by the processor 702 to perform acts or actions that implement desired functionality of the primary assistant 102. The memory 704 may be a type of computer storage media and may include volatile and nonvolatile memory. Thus, the memory 704 may include, but is not limited to, RAM, ROM, EEPROM, flash memory, or other memory technology.

The primary assistant 102 may have an operating system 706 that is configured to manage hardware and services within and coupled to the primary assistant 102. In addition, the primary assistant 102 may include audio processing components 708 for capturing and processing audio including user speech. The operating system 706 and audio processing components 708 may be stored by the memory 704 for execution by the processor 702.

The primary assistant 102 may have one or more microphones 710 and one or more speakers 712. The one or more microphones 710 may be used to capture audio from the environment of the user, including user speech. The one or more microphones 710 may in some cases comprise a microphone array configured for use in beamforming. The one or more speakers 712 may be used for producing sound within the user environment, which may include generated or synthesized speech.

The audio processing components 708 may include functionality for processing input audio signals generated by the microphone(s) 710 and/or output audio signals provided to the speaker(s) 712. As an example, the audio processing components 708 may include one or more acoustic echo cancellation or suppression components 714 for reducing acoustic echo in microphone input signals, generated by acoustic coupling between the microphone(s) 710 and the speaker(s) 712. The audio processing components 708 may also include a noise reduction component 716 for reducing noise in received audio signals, such as elements of audio signals other than user speech.

The audio processing components 708 may include one or more audio beamformers or beamforming components 718 that are configured to generate or produce multiple directional audio signals from the input audio signals received from the one or more microphones 710. AEC may be applied by the primary assistant 102 to any or all of such directional audio signals.

The primary assistant 102 may also implement a proximity detector 720 that is configured to perform the actions described above in order to detect conditions in which the secondary assistant 104 is too close to the primary assistant 102. Note that either or both of the primary and secondary assistants may utilize or implement such proximity detection.

Figure 8:
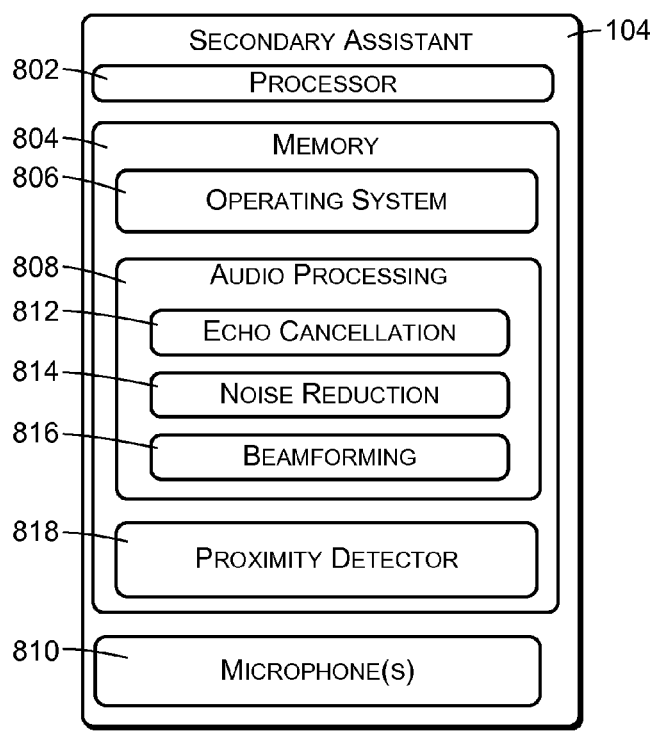
FIG. 8 is a block diagram illustrating example components and functionality of the secondary assistant.

FIG. 8 shows an example functional configuration of the secondary assistant 104. In certain embodiments, the secondary assistant 104 may implement a subset of the functionality of the primary assistant 102. For example, the secondary assistant 104 may function primarily as an auxiliary microphone unit that provides a secondary audio signal to the primary assistant 102. The primary assistant 102 may receive the secondary audio signal and may process the secondary audio signal using the audio processing components 708.

The secondary assistant 104 includes operational logic, which in many cases may comprise a processor 802 and memory 804. The processor 802 may include multiple processors and/or a processor having multiple cores. The memory 804 may contain applications and programs in the form of instructions that are executed by the processor 802 to perform acts or actions that implement desired functionality of the secondary assistant 104. The memory 804 may be a type of computer storage media and may include volatile and nonvolatile memory. Thus, the memory 804 may include, but is not limited to, RAM, ROM, EEPROM, flash memory, or other memory technology.

The secondary assistant 104 may have an operating system 806 that is configured to manage hardware and services within and coupled to the secondary assistant 104. In addition, the secondary assistant 104 may include audio processing components 808. The operating system 806 and audio processing components 808 may be stored by the memory 804 for execution by the processor 802.

The secondary assistant 104 may have one or more microphones 810, which may be used to capture audio from the environment of the user, including user speech. The one or more microphones 810 may in some cases comprise a microphone array configured for use in beamforming.

The audio processing components 808 may include functionality for processing input audio signals generated by the microphone(s) 810. As an example, the audio processing components 808 may include one or more acoustic echo cancellation or suppression components 812 for reducing acoustic echo in microphone input signals, generated by acoustic coupling between the speaker(s) 712 of the primary assistant 102 and the microphone(s) 810 of the secondary assistant 104. The audio processing components 808 may also include a noise reduction component 814 for reducing noise in received audio signals, such as elements of audio signals other than user speech.

The audio processing components 808 may include one or more audio beamformers or beamforming components 816 that are configured to generate or produce multiple directional audio signals from the input audio signals received from the one or more microphones 810. AEC may be applied to any or all of the directional audio signals that are produced in this manner.

The secondary assistant 104 may also implement a proximity detector 818 that is configured to perform the actions described above in order to detect conditions in which the secondary assistant 104 is too close to the primary assistant 102. Note that either or both of the primary and secondary assistants may utilize or implement such proximity detection.

Although the subject matter has been described in language specific to structural features, it is to be understood that the subject matter defined in the appended claims is not necessarily limited to the specific features described. Rather, the specific features are disclosed as illustrative forms of implementing the claims.

The invention claimed is:

1. A first device comprising:
a microphone configured to produce a first input audio signal representing output audio produced by a speaker of a second device, wherein the first device is positioned at a distance from the second device;
an adaptive finite impulse response (FIR) filter configured to cancel the output audio from the first input audio signal based at least in part on a reference signal received from the second device and a sequence of dynamically updated filter coefficients;
a detector configured to perform acts comprising:
determining a measurement corresponding to the output audio in the first input audio signal by analyzing the sequence of dynamically updated filter coefficients;
determining that the measurement does not satisfy a criteria; and
providing a notification that one of the first and second devices should be moved to increase the distance between the first device and the second device.

2. The first device of claim 1, wherein:
the measurement comprises the distance from the second device; and
the criteria comprises a minimum distance.

3. The first device of claim 1, wherein the measurement comprises a strength of the output audio in the first input audio signal.

4. A method, comprising:
obtaining a first input audio signal representing audio received at a first device, wherein the first input audio signal represents output audio produced by a speaker of a second device;
obtaining a reference signal, wherein the second device used the reference signal to generate the output audio;
cancelling the output audio from the first input audio signal using a finite impulse response (FIR) filter corresponding to a first sequence of filter coefficients and the reference signal;
determining a measurement of the output audio in the first input audio signal by analyzing the first sequence of filter coefficients;
determining that the measurement does not satisfy a criteria; and
providing a notification to increase a distance between the first device and the second device.

5. The method of claim 4, wherein the filter coefficients are dynamically updated.

6. The method of claim 4, wherein obtaining the reference signal comprises receiving the reference signal from the second device.

7. The method of claim 4, wherein the cancelling is performed at the first device.

8. The method of claim 4, wherein the measurement comprises the distance between the first device and the second device and the given criteria comprises a minimum distance.

9. The method of claim 8, wherein determining the measurement comprises (a) identifying a peak filter coefficient in the first sequence of filter coefficients that corresponds to a direct acoustic path between the first device and the second device; and (b) determining the distance between the first device and the second device is based on the position of the peak filter coefficient in the first sequence of filter coefficients.

10. The method of claim 4, wherein the measurement comprises a strength of the output audio in the first input audio signal.

11. The method of claim 10, wherein:
determining the measurement comprises identifying a peak coefficient in the first sequence of filter coefficients that corresponds to a direct acoustic path between the first device and the second device; and
the strength of the output audio in the first input audio signal is determined based at least in part on a magnitude of the peak coefficient.

12. The method of claim 10, further comprising determining the strength of the output audio in the first input audio signal based at least in part on filter coefficient of the first sequence of filter coefficients corresponding to a direct acoustic path between the second device and the first device.

13. The method of claim 10, further comprising determining the strength of the output audio in the first input signal based at least on part on (a) one or more coefficients of the first sequence of filter coefficients corresponding to a direct acoustic path between the second device and the first device; and (b) one or more coefficients of the first sequence of filter coefficients corresponding to one or more reflective acoustic paths between the second device and the first device.

14. The method of claim 4, further comprising:
obtaining a second input audio signal representing audio received at the second device;
cancelling the output audio from the second input audio signal based at least in part on the reference signal and a second sequence of filter coefficients; and
wherein determining the measurement is performed as a function of the first and second sequences of filter coefficients.

15. The method of claim 14, wherein the determining the measurement comprises:
determining a first strength of the output audio in the first input audio signal by analyzing the first sequence of filter coefficients; and
determining a second strength of the output audio in the second input audio signal by analyzing the second sequence of filter coefficients.

16. The method of claim 14, wherein the determining the measurement comprises:
calculating a first ratio of direct versus reflective strengths of the output audio in the first input audio signal; and
calculating a second ratio of direct versus reflective strengths of the output audio in the second input audio signal.

17. A method comprising:
obtaining a first input audio signal representing audio received at a first device, wherein the first input audio signal represents output audio produced by a speaker of a second device;
cancelling the output audio from the first input audio signal based at least in part on a first set of filter parameters;
determining a measurement of the output audio in the first input audio signal based at least in part on the first set filter parameters;
determining that the measurement does not satisfy a criteria; and
providing a notification to increase a distance between the first device and the second device.

18. The method of claim 17, wherein the measurement comprises the distance between the first device and the second device and the criteria comprises one or more of a minimum distance and a maximum distance.

19. The method of claim 17, wherein determining the measurement comprises comparing direct versus reflective strengths of the output audio in the first input audio signal.

20. The method of claim 17, wherein the measurement comprises a strength of the output audio in the first input audio signal.

21. The method of claim 20, wherein determining the measurement comprises determining the strength of the output audio in the first input audio signal based at least in part on one or more of the first set of filter parameters corresponding to a direct acoustic path between the second device and the first device.

22. The method of claim 20, wherein determining the measurement comprises determining the strength of the output audio in the first input audio signal by comparing (a) one or more of the first set of filter parameters corresponding to a direct acoustic path between the second device and the first device; and (b) one or more of the first set of filter parameters corresponding to one or more reflective acoustic paths between the second device and the first device.

23. The method of claim 17, further comprising:
obtaining a second input audio signal representing audio received at the second device;

cancelling the output audio from the second input audio signal based at least in part on a second set of filter parameters; and wherein determining the measurement is performed as a function of the first and second sets of filter parameters.

24. The method of claim 23, wherein determining the measurement comprises:

determining a first strength of the output audio in the first input audio signal by analyzing the first set of filter parameters; and determining a second strength of the output audio in the second input audio signal by analyzing the second set of filter parameters.

* * * * *